United States Patent [19]
Christensen

[11] Patent Number: 5,681,074
[45] Date of Patent: Oct. 28, 1997

[54] TRAILER COVER LIFT ARM

[76] Inventor: Carl E. Christensen, 2415 149th Ave. NE., Ham Lake, Minn. 55304

[21] Appl. No.: 427,431

[22] Filed: Apr. 24, 1995

[51] Int. Cl.$^6$ ............................. B60P 7/02; B62D 33/04
[52] U.S. Cl. .............. 296/181; 296/100; 292/338; 220/333; 49/193; 49/345; 49/382
[58] Field of Search ............... 296/26, 100, 181; 292/338; 220/333; 16/302; 49/193, 339, 345, 382

[56] References Cited

U.S. PATENT DOCUMENTS

| | | | |
|---|---|---|---|
| 2,683,280 | 7/1954 | Martens . | |
| 2,751,624 | 6/1956 | Lipking . | |
| 2,963,313 | 12/1960 | Bennett | 296/26 |
| 3,051,523 | 8/1962 | Boyce-Smith et al. | 296/100 |
| 3,093,406 | 6/1963 | Barenyi . | |
| 3,765,716 | 10/1973 | Van Gompel | 296/100 |
| 3,797,178 | 3/1974 | Mule | 49/193 X |
| 3,923,334 | 12/1975 | Key | 296/100 X |
| 4,629,243 | 12/1986 | Jenson | 296/100 |
| 4,768,824 | 9/1988 | Andonian | 296/105 X |
| 4,819,981 | 4/1989 | Moe et al. | 296/100 |

FOREIGN PATENT DOCUMENTS

| | | | |
|---|---|---|---|
| 629557 | 10/1961 | Canada | 296/100 |

OTHER PUBLICATIONS

Triton Corporation, Allenton, Wisconsin, brochure copyright 1994.
Eagle Trailers, L & H Manufacturing, Inc., Fairmont, Minnesota, brochure published on or before Apr. 24, 1995.

*Primary Examiner*—Dennis H. Pedder
*Attorney, Agent, or Firm*—Nawrocki, Rooney & Sivertson

[57] ABSTRACT

A trailer cover lift arm for assisting in opening a trailer cover and supporting the cover in an open position. The lift arm can include four elongate members each member having two ends pivotably coupled to define a member having parallelogram-like shape. First and second elongated gas springs can be disposed within the parallelogram member to assist an operator in opening, and supporting a trailer cover in an open position. The lift arm can be used to two-way tilt open a trailer cover.

10 Claims, 3 Drawing Sheets

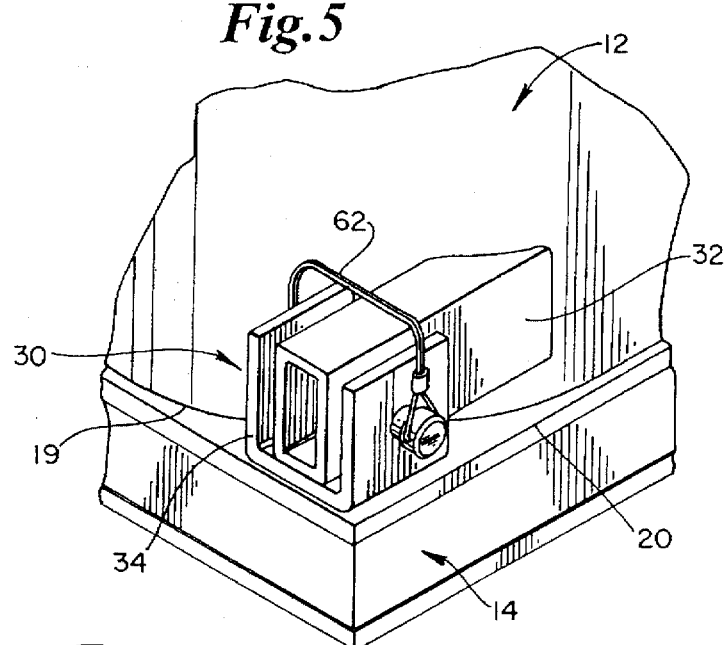
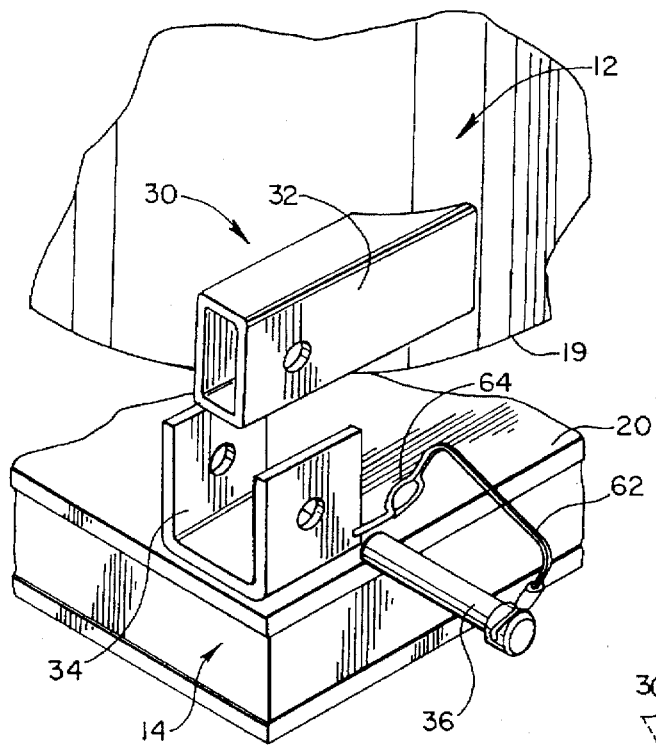
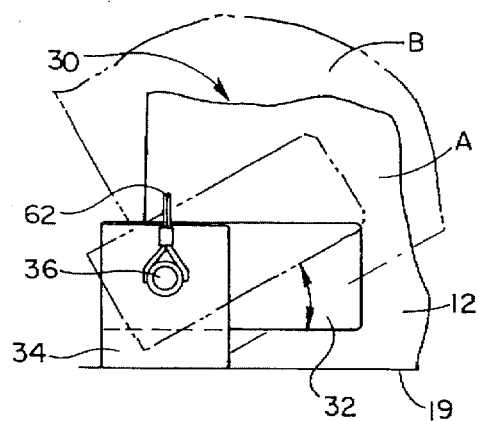

TRAILER COVER LIFT ARM

FIELD OF THE INVENTION

The present invention pertains generally to trailer covers and, in particular, to lift arms for trailer covers.

BACKGROUND OF THE INVENTION

Trailers having covers to protect items being transported have been used for many years. In order to load a trailer including a cover, the cover generally must either be removed from the trailer or tilted open toward an end of the trailer. If the trailer cover is removed, the trailer may be easily accessed from either end or both sides. If, however, the cover is tilted open toward one end of the trailer, the trailer can be easily accessed only from the opposite end of the trailer. When the cover is tilted open, that portion of the trailer proximate the end of the trailer about which the cover is pivoted open, is difficult or impossible to access because that portion of the trailer is still partially or completely covered.

In some applications, it may be impractical to remove the cover. If the cover is relatively heavy and the trailer is configured to be loaded by one person, it may be preferable not to remove the cover, but rather, to tilt open the cover. When the cover is tilted open, a significant portion of the weight of the cover is supported on one end of the cover. The operator rather than supporting the entire weight of the trailer, need only support or lift the opposite end. Once the end of the trailer is lifted, a prop rod or rods may be positioned to support the cover in a tilted open position. Although, tilting open the trailer cover may require less effort than removing the cover, tilting the cover may require undesirable exertion by the operator until the prop rods are in place to support the cover in the tilted open position.

SUMMARY OF THE INVENTION

The present invention pertains to lift arms having gas springs to assist an operator to tilt open a trailer cover. In a preferred embodiment, the arms can support the cover in a tilted open position. A significant feature of the lift arms is that they can be used to tilt open the trailer cover toward the front or toward the rear of the trailer. This "two-way" tilt feature allows easy access to items in either the front or the rear of the trailer. This feature also allows vehicles to be driven onto the rear of the trailer and off of the front of the trailer. The ability to drive vehicles onto the rear of the trailer and off the front of the trailer can be particularly desirable in the case of snowmobiles or other vehicles which are difficult to reverse.

The lift arm for supporting a cover of a trailer in accordance with the present invention can include first, second, third and fourth elongated members. Each member has two ends pivotably coupled to define a member having a parallelogram-like shape. The parallelogram member has four corners wherein one corner of the parallelogram member is adapted for connection to the cover and a diagonally opposite corner of the parallelogram member is adapted for connection to the trailer.

The lift arm can include a first elongated gas spring having two ends and being disposed within the parallelogram member. One end of the gas spring is pivotably coupled to the first elongate member between the ends of the first member. The opposite end of the gas spring is pivotably coupled to the parallelogram member proximate one of the corners. The arm can also include a second elongated gas spring having two ends and being disposed within the parallelogram member. One end of the gas spring is pivotably connected to the second elongate member between the ends of the second member. The opposite end of the second gas spring is pivotably connected to the corner of the parallelogram member disposed diagonally opposite the corner which the first gas spring is coupled near.

The arms can be used in conjunction with a trailer cover comprising a fiberglass shell adapted for covering at least a portion of the trailer. The shell can include a first end and oppositely disposed second end and oppositely disposed sides. A first releasable hinge coupling at the first end of the shell is adapted for releasably coupling the shell to an end of the trailer. A second releasable hinge coupling at the second end of the shell is adapted for releasably coupling the shell to an opposite end of the trailer.

Two lift arms are preferably connected to opposite sides of the shell. One end of each of the lift arms is connected to the shell. To allow the shell to be tilted open toward the front and rear, the opposite end of each of the lift arms is pivotably connected to the trailer such that the shell can be pivoted open about the first hinge coupling and be supported by the lift arms when the second coupling is released. Alternately, the shell can also be pivoted open about the second hinge coupling and be supported by the lift arms when the first coupling is released.

BRIEF DESCRIPTION OF THE DRAWINGS

FIG. 5 is a perspective view of a releasable hinge coupling;

FIG. 6 is a perspective view of the releasable hinge coupling of FIG. 3 shown uncoupled; and FIG. 7 is a side view of the releasable hinge coupling of FIG. 3 in a first position and shown in phantom lines in a second position;

DETAILED DESCRIPTION OF THE INVENTION

Figure 1:
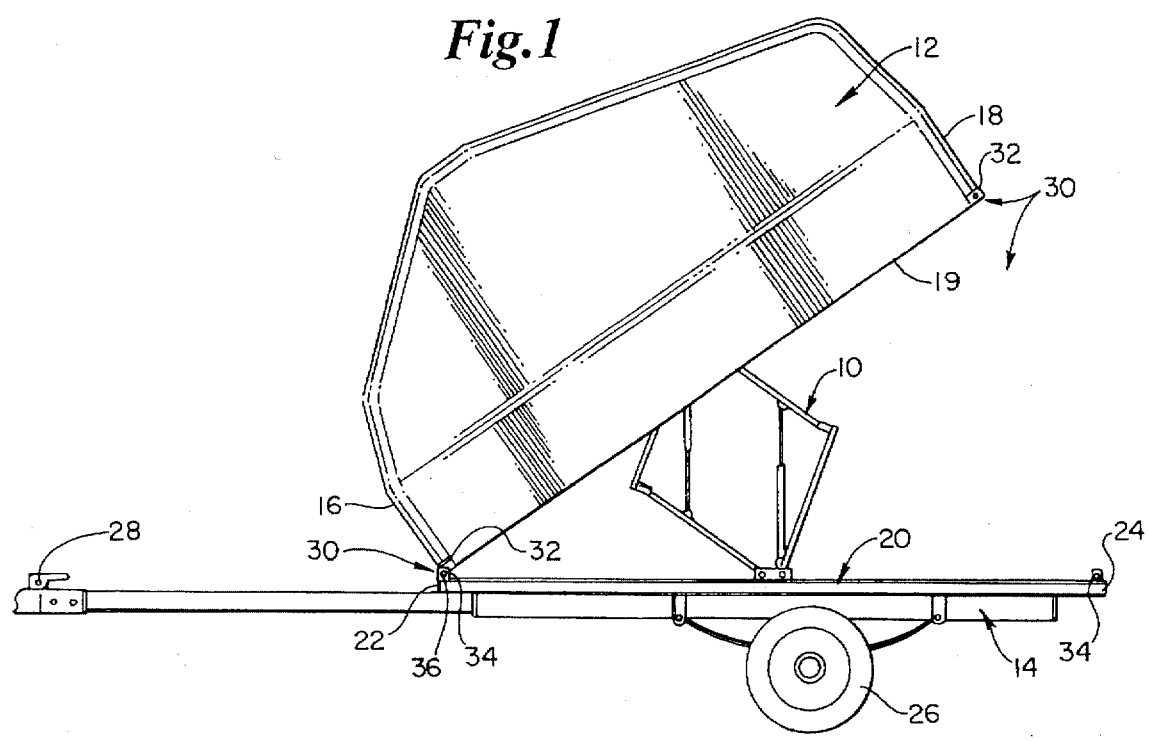
FIG. 1 is a side view of a trailer including a cover tilted open toward the front of the trailer.

Referring now to the drawings wherein like reference numerals refer to the same elements throughout the several views, FIG. 1 is a side view of a lift arm 10 in accordance with the present invention for a cover 12 mounted on a trailer 14. As shown in FIG. 1, cover 12 is in a tilted open position supported by arm 10. An upper portion of arm 10 is obscured by cover 12.

Lift arm 10 can be used to support various rigid or semi-rigid trailer covers. As shown in FIG. 1, cover 12 is a generally hollow fiberglass shell. Cover 12 includes a front end 16, a rear end 18, and a bottom 19. Cover 12 also includes two oppositely disposed sides, one of which is shown in FIG. 1 and the other is hidden behind the side shown. In a preferred embodiment, cover 12 is supported by two lift arms 10, one arm 10 being connected to each side of cover 12. In FIG. 1, the second arm 10 is obscured by the lift arm 10 shown.

In addition to being able to use lift arm 10 with various covers, arm 10 can also be used with various trailers. As shown in FIG. 1, trailer 14 is a flat-bed trailer including a bed 20 having a forward end 22 and a rear end 24. Bed 20 includes two oppositely disposed sides, one of which is shown in FIG. 1 and the other is hidden behind the side shown. As well known in the art, the trailer includes wheels 26 and a hitch 28. When cover 12 is in a closed position on trailer 14, bottom 19 preferably rests on bed 20.

Two releasable hinge couplings 30 are disposed at front end 16 of cover 12 and front end 22 of trailer 20. Two releasable hinge couplings 30 are also disposed at rear 18 of cover 12 and rear 24 of bed 20. The two couplings 30 at front 16 of cover 12 are preferably positioned at opposite sides of cover 12. Similarly, the two couplings 30 disposed at rear 18 of cover 12 are preferably positioned at opposite sides of cover 12. Each releasable hinge coupling 30 includes a post 32 fixably attached to cover 12 and a U-shaped bracket 34 fixably attached to trailer 14 to receive post 32. A removable pin 36 releasably couples post 32 into bracket 34.

Figure 2:
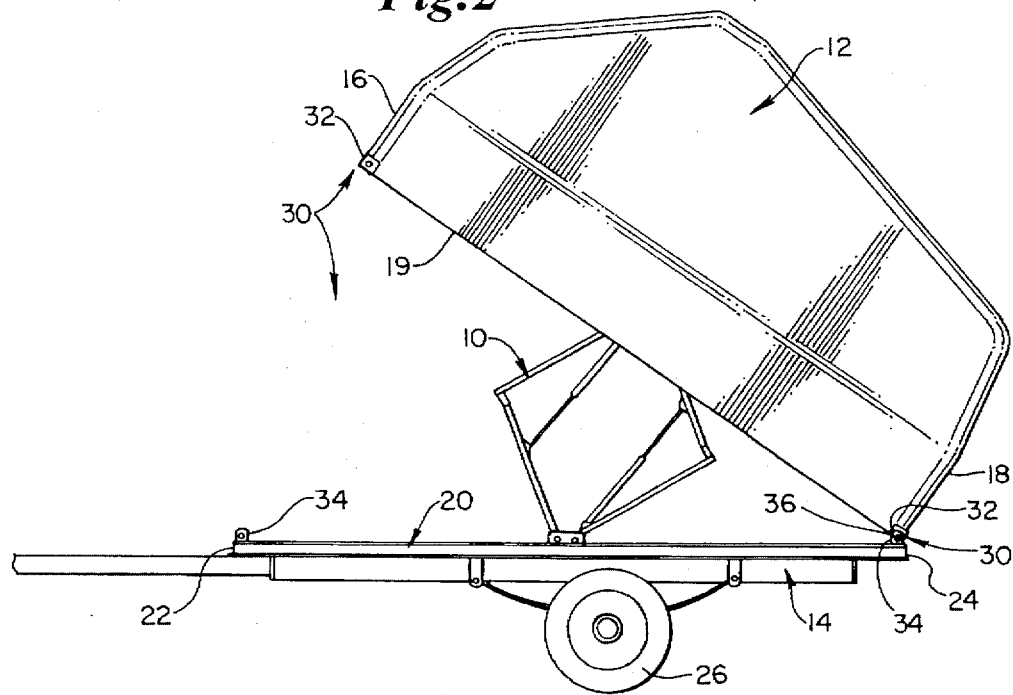
FIG. 2 is a side view of the trailer of FIG. 1 with the cover tilted open toward the rear of the trailer.

FIG. 2 is also a side view of cover 12 and trailer 14. In this case, however, cover 12 is shown tilted open to the rear while being supported by lift arm 10.

Figure 3:
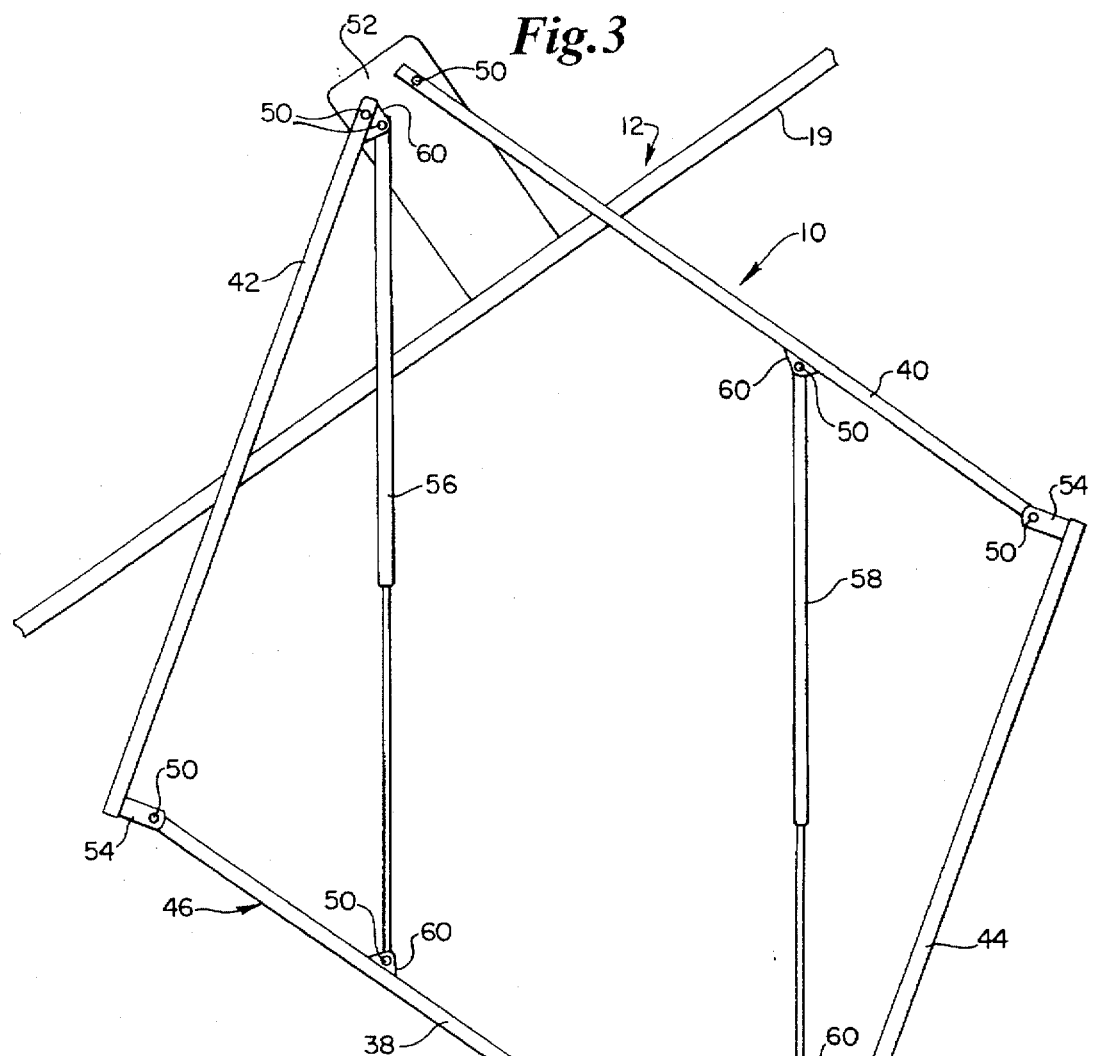
FIG. 3 is a side view of a lift arm in accordance with the present invention shown in an open or extended position.

FIG. 3 is a side view of lift arm 10 in an extended position supporting cover 12 as shown in FIG. 1. The view in FIG. 3, however, shows that portion of arm 10 which is obscured by cover 12 in FIG. 1. Lift arm 10 preferably includes four elongate members, a first member 38, an oppositely disposed second member 40, a third member 42 and an oppositely disposed fourth member 44. Members 38, 40, 42, and 44 are preferably pivotably coupled at their ends to define a parallelogram-like member 46. Although a parallelogram-like arrangement of members 38, 40, 42, and 44 is preferred, it should be understood that the relative lengths of these members may be varied without departing from the principles of the present invention.

One end of first member 38 and fourth member 44 is preferably pivotably connected to a plate 48 fixably attached to trailer 14. Pins 50 can pivotably connect members 38 and 44 to plate 48. Similarly, one end of second member 40 and third member 42 can be pivotably connected to a plate 52 which is fixably attached to cover 12. Pins 50 can also be used to pivotably connect members 40 and 42 to plate 52.

The end of first member 38 and third member 42 opposite plates 48 and 52, respectively are pivotably coupled. A plate 54 can be fixably attached to member 42 and a pin 50 can pivotably connect member 38 to member 42 by way of plate 54. The end of second member 40 and fourth member 44 opposite plates 52 and 48, respectively can be pivotably attached in a like manner.

Lift arm 10 preferably includes two gas springs 56 and 58 disposed within parallelogram-like member 46. In a preferred embodiment, gas springs 56 and 58 are pivotably connected to members 38, 40, 42, and 44 by plates 60, fixedly connected to those members, and pins 50 rotatably coupling gas springs 56 and 58 to plates 60. As shown in FIG. 3, a gas spring 56 extends from a point between the ends of elongate member 38 to the end of elongate member 42 pivotably coupled to plate 52. Similarly, gas spring 58 extends from a point between the ends of elongate member 40 to the end of elongate member 44 pivotably coupled to plate 48. Both springs 56 and 58 are shown extended or substantially uncompressed.

Figure 4:
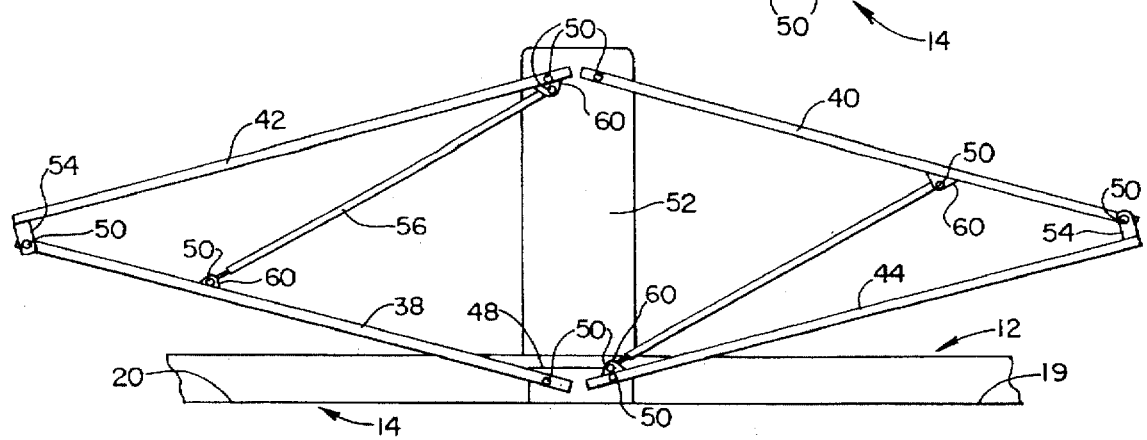
FIG. 4 is a side view of the lift arm as shown in an unextended or closed position.

FIG. 4 is a side view of the lift arm 10 shown in FIG. 3 in a retracted position. In FIG. 4, bottom 19 of cover 12 is resting on bed 20 of trailer 14. Elongate members 38, 40, 42, and 44 have pivoted about pins 50 narrowing parallelogram-like member 46. Gas springs 56 and 58 are shown compressed. Gas springs 56 and 58 preferably produce a force sufficient to support a trailer cover in a tilted open position, yet a force low enough that the weight of the cover will hold the cover closed.

FIG. 5 is a perspective view of releasable hinge coupling 30. Post 32, fixably connected to cover 12, is shown received within U-shaped bracket 34 which is fixably connected to trailer 14. Pin 36 is shown extending through breaker 34 and post 32. A bail 62 is fixedly connected to one end of pin 36 and releasably connected to the opposite end to retain pin 36 within coupling 30.

FIG. 6 is a perspective view of releasable hinge coupling 30 shown in a released position. Pin 36 is shown removed from holes through post 32 and bracket 34. Post 32 is removed from bracket 34. The releasable end of bail 62 is shown disconnected from pin 36 and includes a resilient circular coupling 64 for releasably coupling bail 62 to pin 36.

FIG. 7 is a side view of the releasable hinge coupling 30 shown in FIG. 5. In FIG. 7, cover 12 is shown in a first closed position A and a tilted open position B. FIG. 7 shows that as cover 12 is moved between the first closed position and the second tilted open position, post 32 pivots around pin 36.

In use, cover 12 can be tilted open toward front end 16 of cover 12 as shown in FIG. 1, or toward rear end 18 of cover 12 as shown in FIG. 2. When cover 12 is tilted open toward front end 16, the releasable hinge couplings 30 at rear end 18 of cover 12 are uncoupled by removing pins 36 as shown in FIG. 6. The operator then lifts the rear end 18 of cover 12. As the operator lifts cover 12, springs 56 and 58 extend to assist the operator. As the operator continues to lift cover 12, springs 56 and 58 provide enough force to hold cover 12 in the tilted open position. To tilt open cover 12 toward rear 18 of cover 12, coupling 30 is recoupled by replacing pins 36 as shown in FIG. 5. The couplings 30 at front 16 of cover 12 are uncoupled by removing pin 36 as described previously. Again, springs 56 and 58 assist the operator in opening the cover and hold cover 12 open. It can be appreciated that arm 10 will only support cover 12 in an open position if the holding force provided by arm 10 is great enough to support the weight of the cover not supported by couplings 30.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A lift arm for supporting a cover of a trailer, comprising:

first, second, third, and fourth elongate members, each member having two ends pivotably coupled to define a member having a parallelogram-like shape, the parallelogram member having four corners, wherein one corner of the parallelogram member includes means for connection to the cover and a diagonally opposite corner of the parallelogram member includes means for connection to the trailer; and a first elongate gas spring having two ends and being disposed within the parallelogram member, one end of the gas spring being pivotally coupled to the first elongate member between the ends of the first member, and the opposite end of the gas spring being pivotally coupled to the parallelogram member proximate one of the corners of the parallelogram member.

2. A lift arm in accordance with claim 1, further comprising a second elongate gas spring having two ends and being disposed within the parallelogram member, one end of the gas spring being pivotally connected to the second elongate member between the ends of the second member, and the opposite end of the second gas spring being pivotally connected to the corner of the parallelogram member disposed diagonally from the corner the first gas spring is coupled near.

3. A lift arm in accordance with claim 1, wherein the means for connection to the cover includes a first plate and the means for connection to the trailer includes a second plate, wherein one end of both the second and third members are pivotally connected to the first plate and one end of both the first and fourth members are pivotally connected to the second plate.

4. A lift arm in accordance with claim 3, further comprising a third plate wherein the ends of the third and first members opposite the first and second plates respectively, are connected to the third plate.

5. A lift arm in accordance with claim 3, further comprising a fourth plate wherein the ends of the second and fourth members opposite the first and second plates respectively, are connected to the fourth plate.

6. A two-way tilt cover assembly for a trailer comprising:

a shell including a first end and an oppositely disposed second end, and oppositely disposed sides; and means for pivotally opening the shell about the shell's first end and about the shell's second end and supporting the shell when open, wherein the means for pivotally opening the shell includes first and second lift arms, each having two ends, one end of each arm being connected to opposite sides of the shell between the first and second ends of the shell, and the opposite ends of the first and second lift arms having a connector for connecting the lift arms to the trailer;

each lift arm including first, second, third, and fourth elongate members, each member having two ends pivotally coupled to define a member having a parallelogram-like shape, the parallelogram member having four corners, wherein one corner of the parallelogram member is connected to the shell and a diagonally opposite corner of the parallelogram member being at the connector for connecting to the trailer; and an elongate gas spring having two ends and being disposed within the parallelogram member, one end of the gas spring being pivotally coupled to the first elongate member between the ends of the first member, and the opposite end of the gas spring being pivotally coupled to the parallelogram member proximate one of the corners of the parallelogram member.

7. A two-way tilt cover assembly in accordance with claim 6, wherein the means for pivotably opening the shell includes a first releasable hinge coupling at the first end of the shell and a second releasable hinge coupling at the second end of the shell, each coupling being adapted for releasably coupling to opposite ends of the trailer.

8. A two-way tilt cover assembly in accordance with claim 6, further comprising a second elongate gas spring having two ends and being disposed within the parallelogram member, one end of the gas spring being pivotally connected to the second elongate member between the ends of the second member, and the opposite end of the elongate member being pivotally connected to the corner of the parallelogram member disposed diagonally from the corner the first gas spring is coupled near.

9. A two-way tilt cover assembly in accordance with claim 6, further comprising first and second plates, the first plate being connected to the shell and the second plate forming a portion of the connector for connecting to the trailer, wherein one end of both the second and third members are pivotally connected to the first plate and one end of both the first and fourth members are pivotally connected to the second plate.

10. A two-way tilt cover assembly in accordance with claim 6, wherein the shell comprises fiberglass.

* * * * *